United States Patent [19]
Phelon et al.

[11] 3,885,177
[45] May 20, 1975

[54] POLE-SHOE MAGNET GROUP FOR A MAGNETOMOTIVE DEVICE

[75] Inventors: Russell D. Phelon, Longmeadow; John C. Van Amsterdam, Wilbraham, both of Mass.

[73] Assignee: R. E. Phelon Company, Incorporated, East Longmeadow, Mass.

[22] Filed: June 7, 1974

[21] Appl. No.: 477,335

Related U.S. Application Data
[62] Division of Ser. No. 318,521, Dec. 26, 1972.

[52] U.S. Cl............................. 310/153; 310/156
[51] Int. Cl. .......................................... H02k 21/22
[58] Field of Search ...... 335/209; 310/42, 153, 156; 29/618, 598

[56] References Cited
UNITED STATES PATENTS

| | | | |
|---|---|---|---|
| 2,446,761 | 8/1948 | Harmon | 310/153 |
| 2,756,356 | 7/1956 | Brownlee et al. | 310/153 |
| 3,192,439 | 6/1965 | Shaw | 310/153 X |

*Primary Examiner*—G. Harris
*Attorney, Agent, or Firm*—Chapin, Neal and Dempsey

[57] ABSTRACT

A pole-shoe magnet group for a flywheel magneto which is composed of a plurality of integral ferromagnetic laminations embracing a permanent magnet. Each of the laminations has at least two pole-shoe portions interconnected by a web disposed inwardly of the outer surface of the pole-shoes, whereby the web portion of said laminations are removable in a single drilling operation.

3 Claims, 6 Drawing Figures

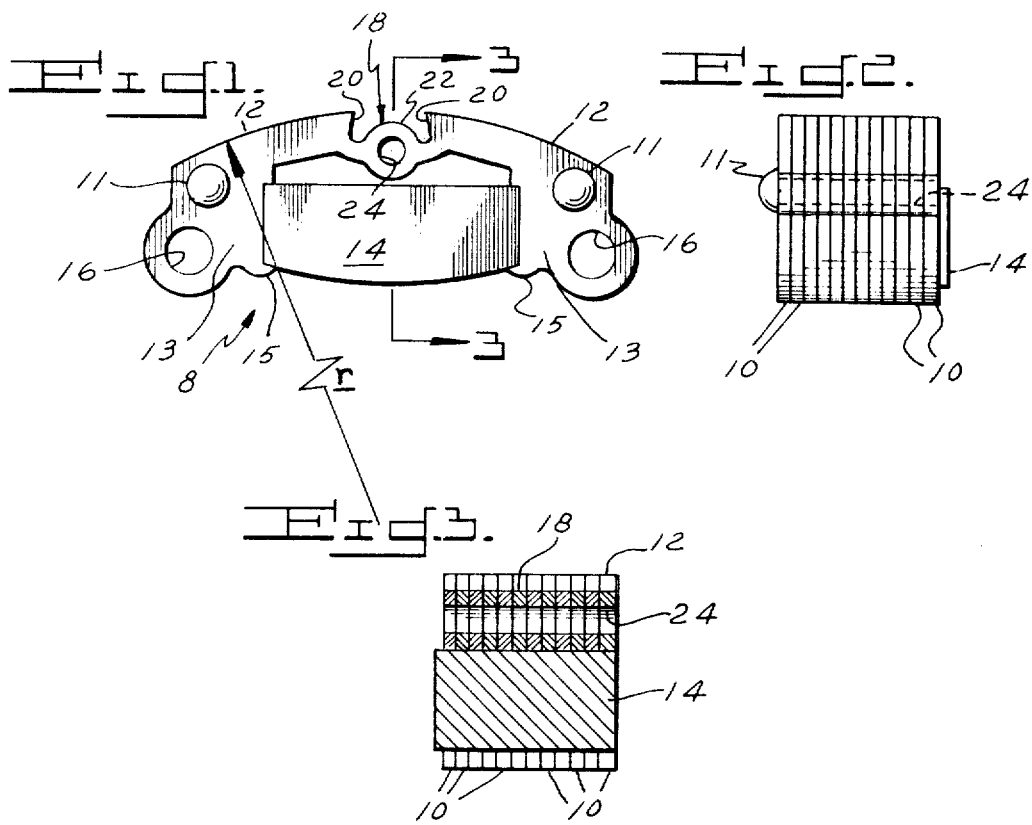

POLE-SHOE MAGNET GROUP FOR A MAGNETOMOTIVE DEVICE

The present application is a divisional application of copending application, Ser. No. 318,521, filed Dec. 26, 1972.

BACKGROUND

Magnetomotive devices, such as a flywheel magneto, serve the dual function of a spark ignition generator and the engine flywheel. Such magnetos are usually aluminum or zinc castings having a pole-shoe magnet group encapsulated in the rim of the rotor. The pole-shoe group generally consists of a plurality of stacked ferromagnetic laminations riveted together in clamping relation about a permanent bar magnet. Each of the laminations includes two pole-shoe portions interconnected by a web so that each lamination is integral as is also the assembly of the laminations and permanent magnet.

This arrangement facilitates the handling of the pole-shoe component, including its placement into the mold cavity used in casting the nonmagnetic flywheel body. The web interconnecting the two pole-shoe portions has heretofore been disposed radially outward of the outer surface of the pole-shoes. With this construction, when the flywheel is cast and the pole-shoe group is encapsulated in the rim thereof, the web portions of the stacked laminations project radially outward or inward of the final flywheel diameter, depending on whether the stator is to be located within or outside the flywheel rim. A turning operation is thus required to machine the wheel to its finished inner or outer diameter as the case may be. In doing so, the webs of the stacked laminations are removed so that the two poles are magnetically separated, thereby providing a flux path from pole-to-pole which is radially outward of the flywheel rim. While this conventional method provides functionally suitable flywheel magnetos, the turning operation required to machine off the interconnecting web portions of the stacked laminations is relatively costly and time consuming.

It is the principal object of this invention to provide an improved method of fabricating a cast magnetomotive device having a pole-shoe magnet group therein which eliminates the necessity of a turning operation.

A further object of this invention is to provide a pole-shoe magnet group for use in fabricating cast magnetomotive components of the above type in which each of the stacked laminations of the magnet group has an interconnecting web bridging the space between the pole-shoe portions thereof with the web disposed radially inward of the outer diameter of the pole-shoe portions of the group.

The above and other objects and advantages of this invention will be more readily apparent from the following description and with reference to the accompanying drawings, in which:

FIG. 1 is a plan view of a pole-shoe magnet group of the type which may be used in carrying out this invention;

FIG. 2 is an end elevational view of the group;

FIG. 3 is a section taken along line 3—3 of FIG. 1;

FIG. 4 is a plan view of one type of flywheel magneto fabricated in accordance with this invention and containing the magnet group of FIG. 1;

Figure 5:
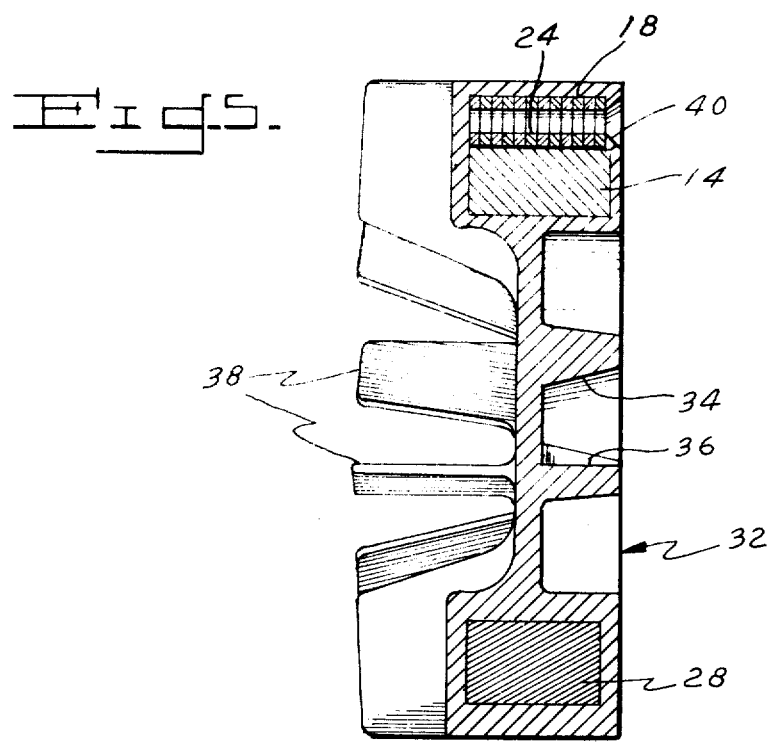
FIG. 5 is a section taken along line 5—5 of FIG. 4.

Referring in detail to the drawings, in FIG. 1 is shown a pole-shoe magnet group 8 of the type embodying this invention and which may be used in carrying out the method of the invention. The group is composed of an assembly of a plurality of stacked ferromagnetic laminations 10 fastened together by rivets 11 in superposed relationship. Each lamination 10, of which twelve are shown in the drawings, consists of a pair of pole-shoe portions 12 having a pole-shoe radius of curvature $r$ corresponding to the final diameter of a flywheel into which the magnet group is to be die cast as will be hereinafter more fully described.

Each lamination 10 includes a pair of circumferentially spaced leg portions 13 extending radially of the pole-shoe surfaces 12 and which define therebetween a cavity for receiving a permanent magnet 14 clamped in chord-like orientation between the opposed inner wall portions of the legs 13. At its lower end, each leg includes a small finger-like extension or tongue 15 which is struck over the outer ends of the magnet 14 to assist in holding the magnet in place between the legs. In addition, as shown in FIG. 2, the outer ends of the magnet 14 may be formed to extend slightly over the outer surface of the leg portions 13 so that the magnet is securely retained in position, forming together with the stacked pole-shoe laminations 10, a unitary assembly.

Each lamination 10 is provided with a hole 16 through each of its leg portions 13 and these holes are aligned in registered relation providing, in effect, a bore which extends entirely through each leg portion of the lamination stack. These bores provide means by which the magnet group will be held in place in the die cavity for the casting operation.

Each lamination 10 also includes an interconnecting web 18 which bridges or spans the circumferential distance between opposed inner end surfaces 20 of the pole-shoes 12. The webs 18 extend from the lower end portions of the end walls 20 and join in a cylindrical hub 22. Each lamination 10 is provided with a hole 24 concentric with the cylindrical hub portion 22 of the web whereby a third bore is provided through the stacked laminations which serves as a drill pilot for the subsequent removal of the webs 18 in the completed flywheel.

As shown, the web 18 is preferably located entirely inwardly of the periphery defined by the outer radius of curvature of the pole-shoes 12. This unitary pole-shoe assembly or component which is to serve as the magnet group for a flywheel magneto or other magneto-motive device is placed in the cavity of a casting die by setting the holes 16 on appropriately sized pins. A counterweight 28, FIG. 4, is also provided and includes a pair of circumferentially spaced holes 30 whereby the counterweight may be placed diametrically opposite the magnet group on a second pair of pins. With the magnetic group and the counterweight in place, the mold is closed and charged with a suitable molten material, such as aluminum or zinc and a flywheel of any desired configuration is cast. The mold size is designed so that the final diameter of the flywheel will be flush with the radius of curvature of the pole-shoe group. One such flywheel is shown generally at 32 in FIGS. 4 and 5. Of course, it will be realized that a flywheel having an inwardly-facing, concave pole-shoe magnet group may also be employed for installations having a stator within the flywheel rim.

In the embodiment shown, the flywheel 32 is cast with a bore 34 and keyway 36 adapted to fit a particular engine drive shaft. Radially extending cooling fins 38 are formed on the outerside of the flywheel. A beveled recess or hole 40 is formed in the casting in alignment with the bore 24 of the pole-shoe group and is formed by a correspondingly shaped projection in the die cavity. This provides a pilot hole in the aluminum or zinc casting for a drill bit.

Figure 6:
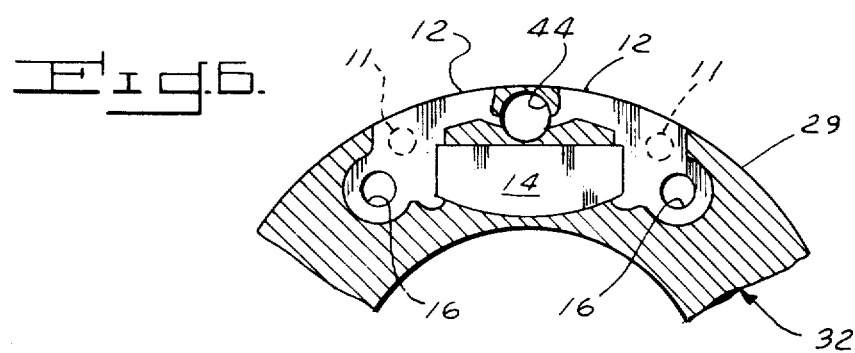
FIG. 6 is a partial plan view of the flywheel of FIG. 4, partly in section, showing the pole-shoe group in its final form.

After the flywheel is cast, it may be necessary to trim off any flashing. This is preferably done by means of a simple trimming or stamping operation which will simultaneously shave away any residual casting material coating the outer surface of the pole-shoes 12. When this trimming operation is completed, the outer surfaces of the pole-shoes 12 will be fully exposed and exactly flush with the outer surfaces 29 of the casting. The web 18 is then removed or severed by broaching, or preferably drilling out the cylindrical hub portion 22 of the web 18, leaving a bore 44, as shown in FIG. 6. If necessary or desirable this bore may be filled with a lightweight nonmagnetic material. Drilling to remove the web is readily accomplished since the steel web is cylindrical in cross section and dimensioned for clean and uniform removal in a single pass of a standard size drill bit. The drill size selected will be just slightly larger than the diameter of the hub 22 so that a thin section, about the steel hub, of the softer nonmagnetic casting material will be reamed away, thus insuring a complete severance of the web 18. In addition, the pilot recess 40 and the bore 24 insure simple and rapid drill location and accurate drill alignment throughout the drilling operation. With the web configuration of the type shown, any tendency for the drill bit to "wander" laterally into the softer casting material is eliminated. If broaching is used, the hub would have the same cross section from pole-to-pole, thus obviating the hub portion 22.

Having removed the hub of the web 18, the two pole-shoes 12 are then magnetically separated and the curved surfaces thereof lying about the pole-shoe radius serve as "surfaces of flux emanation" whereby the magnetic lines of flux generated by the permanent magnet 14 arch from pole-to-pole outwardly of the pole-shoe radius of the flywheel magneto for magnetic linkage with the coil-core group of a stator component (not shown) situated closely adjacent the rim of the flywheel rotor. In a similar manner, if the stator were to be within the rim of the flywheel, as mentioned above, the concave inner surfaces of the pole-shoes would constitute the "surfaces of flux emanation" from which the lines of flux would arch inwardly for linkage with the stator core. Thus in either case, this invention contemplates pole-shoe magnet groups having interconnecting web portions disposed inwardly of the "surfaces of flux emanation" of the pole-shoes.

While advantageously the method embodying this invention may generally be carried out at a single manufacturing site as a unified process, it will be readily appreciated that pole-shoe groups of the type shown and described herein could be manufactured at one facility and shipped and/or sold to other plant facilities for encapsulation in flywheel magnetos in accordance with the method herein disclosed.

Having thus described the invention, what is claimed is:

1. In combination with a flywheel having a rim of nonmagnetic material, a magneto comprising a permanent magnet, a plurality of stacked ferromagnetic laminations fastened together in clamped relation about said magnet and forming a unitary assembly embedded in said nonmagnetic material, said laminations including pole-shoe portions having a pole-shoe radius to provide surfaces of flux emanation for said group, said surfaces being generally flush with a cylindrical surface of said rim, each lamination being integral and including a web portion interconnecting the pole-shoe portions thereof and being disposed inwardly of said surfaces of flux emanation and embedded in said nonmagnetic material forming the rim of said flywheel.

2. In combination with a flywheel as set forth in claim 1 in which said web includes a generally cylindrical portion with a concentric bore therethrough and said nonmagnetic material in which it is embedded includes a recess in alignment with the axis of said bore.

3. A flywheel magneto comprising a rim of nonmagnetic material, a permanent magnet, a plurality of ferromagnetic laminations stacked in superposed relation and in clamping relationship about said magnet, said laminations including pole-shoe portions having a pole-shoe radius to provide surfaces of flux emanation for said group generally flush with a cylindrical surface of said rim, said laminations being engaged with said permanent magnet within said rim and extending from said magnet radially toward said surfaces of flux emanation and then to web portions embedded in said rim, said web portions terminating on opposite sides of a bore extending through said rim in a direction parallel to the axis of rotation of said flywheel.

* * * * *